United States Patent
Shveidel

(10) Patent No.: US 12,436,843 B1
(45) Date of Patent: Oct. 7, 2025

(54) SMOOTH METADATA PAGES STREAM TO RAID BLOCKS IN LOG STRUCTURED METADATA BASED STORAGE CLUSTER

(71) Applicant: Dell Products L.P., Round Rock, TX (US)

(72) Inventor: Vladimir Shveidel, Pardes Hana-Karkur (IL)

(73) Assignee: Dell Products L.P., Round Rock, TX (US)

(*) Notice: Subject to any disclaimer, the term of this patent is extended or adjusted under 35 U.S.C. 154(b) by 36 days.

(21) Appl. No.: 18/626,531

(22) Filed: Apr. 4, 2024

(51) Int. Cl.
*G06F 11/10* (2006.01)
*G06F 11/14* (2006.01)

(52) U.S. Cl.
CPC ...... *G06F 11/1092* (2013.01); *G06F 11/1088* (2013.01); *G06F 11/1471* (2013.01)

(58) Field of Classification Search
CPC ............. G06F 11/1092; G06F 11/1088; G06F 11/1076; G06F 11/1471
USPC ...................................................... 714/6.24
See application file for complete search history.

(56) References Cited

U.S. PATENT DOCUMENTS

| | | | |
|---|---|---|---|
| 10,067,837 B1 * | 9/2018 | Natanzon | G06F 21/6245 |
| 11,314,416 B1 | 4/2022 | Shveidel et al. | |
| 11,513,727 B2 | 11/2022 | Vankamamidi et al. | |
| 11,656,942 B2 | 5/2023 | Dong et al. | |
| 11,675,747 B2 | 6/2023 | Gazit et al. | |
| 11,797,525 B2 | 10/2023 | Shveidel et al. | |
| 11,893,259 B2 | 2/2024 | Giterman et al. | |
| 2016/0170639 A1 * | 6/2016 | Velayudhan | G06F 3/0689 711/114 |
| 2021/0216531 A1 * | 7/2021 | Shveidel | G06F 16/2365 |
| 2024/0370433 A1 * | 11/2024 | Kondiles | G06F 11/10 |
| 2025/0053346 A1 * | 2/2025 | Laier | G06F 3/064 |

FOREIGN PATENT DOCUMENTS

GB 2609709 A * 2/2023 .......... G06F 11/1448

* cited by examiner

*Primary Examiner* — Chae M Ko
(74) *Attorney, Agent, or Firm* — BainwoodHuang

(57) ABSTRACT

Techniques for implementing metadata streams that provide increased performance and resiliency. The techniques include writing raw delta updates of metadata pages to a metadata delta log, and generating a metadata stream for a metadata page containing bulk updates. The techniques include passing the metadata stream to a tiered storage array, and storing the metadata page in a physical block on a metadata page tier. The techniques include, in response to storing the metadata page in the physical block, updating, in local memory, parity data for a RAID stripe including the metadata page. The techniques include, once the physical block is filled with metadata pages, storing the parity data from the local memory to a parity page of the stripe. The techniques include, in response to a storage drive failure when the physical block is partially filled with metadata pages, rebuilding the stripe data using the parity data in local memory.

20 Claims, 5 Drawing Sheets

SMOOTH METADATA PAGES STREAM TO RAID BLOCKS IN LOG STRUCTURED METADATA BASED STORAGE CLUSTER

BACKGROUND

Clustered storage systems employ various techniques and methodologies to protect and/or distribute electronic data, such as user data and metadata (MD). In response to receipt of a write input/output (IO) request ("write request") from a storage client computer ("storage client"), a storage processor ("storage node") of a clustered storage system logs pending changes to MD of a storage element (e.g., MD page) in a journal ("MD delta log") implemented in local memory. Once the pending changes to MD of the MD page have been logged in the MD delta log, the storage node sends an acknowledgement to the storage client that issued the write request. The storage node stores the pending changes to MD of the MD page in a storage object (e.g., volume (VOL)) on a storage device (e.g., solid state drive (SSD), hard disk drive (HDD)) of a storage array.

SUMMARY

In a clustered storage system, a storage node can write pending changes to MD ("delta updates") of an MD page to memory structures in volatile memory, and log "raw" delta updates of the MD page in an MD delta log in persistent memory. The volatile memory structures and the MD delta log are herein referred to collectively as the "delta log infrastructure." Upon a determination that the delta log infrastructure is full, or at any other suitable time, the storage node can perform a transaction commit operation to destage the delta updates of the MD page to a volume (VOL) on an MD pages tier of a tiered storage array. The MD pages tier can be a fast tier implemented using solid state drives (SSDs). To that end, the storage node can aggregate any delta updates that correspond to the same MD pages ("small updates"), and store the small updates in an amortized fashion in the VOL. The storage node can also generate an MD stream for highly amortized MD pages containing delta updates ("bulk updates"), pass the MD stream to the tiered storage array, and store the MD pages in the VOL on the MD pages tier. Such MD pages can be destaged from the MD pages tier to a parity RAID (Redundant Array of Independent Disks) tier of the tiered storage array. The parity RAID tier, which can be a slow tier implemented using hard disk drives (HDDs), can provide block-level or page-level striping with distributed parity, in accordance with, for example, RAID-5 or RAID-6 standard levels of RAID.

Techniques are disclosed herein for implementing metadata (MD) streams that provide high performance with increased resiliency for storage nodes that employ MD delta logs and log structured MD. In the disclosed techniques, a storage node can include (or be associated with) a volatile memory, a persistent memory, a logical-to-physical address translation table (TT), and a tiered storage array, which can include an MD pages tier and a parity RAID tier. The TT can map a logical address space of the storage node to a physical address space of the tiered storage array, and be used to track new and old physical layer block (PLB) addresses for MD pages. The volatile memory can include volatile memory structures for storing and/or aggregating (i) all "raw" delta updates of MD pages, (ii) a specialized "drop-delta" (DD) flag for each MD page containing bulk updates, (iii) logical-to-physical address updates of the TT (including new PLB addresses for MD pages), and/or (iv) reference values of PLBs in the process of being filled with MD pages. The DD flag for each MD page containing bulk updates can provide an indication that all delta updates of the MD page that occurred before it was stored in the tiered storage array are no longer valid, and should be dropped or discarded. A hash function (e.g., SHA-1) can be applied to reference values of PLBs in the process of being filled with MD pages, and the resulting hash values can be maintained in a hash table included in the volatile memory. The volatile memory can further include and maintain storage for parity data of RAID stripes that include MD pages stored in partially filled PLBs. The persistent memory can include an MD delta log for logging (i) the raw delta updates of MD pages, (ii) the DD flag for each MD page containing bulk updates, (iii) the logical-to-physical address updates of the TT (including the new PLB addresses for MD pages and their corresponding old PLB addresses), and/or (iv) the reference values of the PLBs in the process of being filled with MD pages. For each transaction commit entry, the MD delta log can maintain raw delta update(s) of an MD page, a DD flag, a TT update (including new and old PLB addresses for the MD page), and/or a reference value of a PLB in the process of being filled with MD pages, atomically within the scope of the transaction.

The disclosed techniques can include, during a transaction commit operation, writing raw delta updates of MD pages to an MD delta log. For each MD page containing bulk updates, at least the bulk updates and a TT update (including new and old PLB addresses for the MD page) can be written to the MD delta log, in association with a unique transaction identifier (ID). The disclosed techniques can include generating an MD stream for the MD page, passing the MD stream to a tiered storage array, and storing the MD page in a physical layer block (PLB) on an MD pages tier of the tiered storage array. The PLB can be in a parity RAID configuration, which can include one or more RAID stripes formed by physical pages and parity pages distributed across multiple storage devices. The PLB can be at least partially filled with stored MD pages. The disclosed techniques can include, in response to storing the MD page in the PLB, updating, in local memory, parity data for a corresponding RAID stripe included in the PLB. The disclosed techniques can include, once the PLB has been completely filled with stored MD pages, storing the updated parity data in at least one parity page (or parity block) of the corresponding RAID stripe, and destaging the PLB in its entirety to a parity RAID tier of the tiered storage array. The disclosed techniques can include, in response to a failure of one of the multiple storage devices when the PLB is only partially filled with stored MD pages, rebuilding the RAID stripe data using the updated parity data in the local memory.

In certain embodiments, a method includes, during performance of a first transaction commit operation by a storage node, writing raw delta updates of MD pages to an MD delta log. At least some of the raw delta updates correspond to bulk updates of a first MD page. The method includes generating an MD stream for the first MD page containing bulk updates, passing the MD stream to a tiered storage array, and storing the first MD page in a PLB on an MD page tier of the tiered storage array. The PLB is only partially filled with MD pages. The method includes, in response to storing the first MD page in the PLB, updating, in local memory, parity data for a RAID stripe including the first MD page, and, in response to a storage drive failure, rebuilding the RAID stripe using the updated parity data in the local memory.

In certain arrangements, the method includes, for the first MD page containing bulk updates, writing, to the MD delta log, the bulk updates of the first MD page, a logical-to-physical address translation table (TT) update for the first MD page, and a PLB reference value, in association with a first unique transaction identifier (ID).

In certain arrangements, the method includes storing the first MD page at a first PLB address of the PLB, in accordance with the TT update for the first MD page. The TT update includes the first PLB address. A logical address of the first MD page is mapped to the first PLB address. The first PLB address corresponds to a first address of the RAID stripe.

In certain arrangements, the method includes synchronizing, in the local memory, at least the bulk updates of the first MD page, and the TT update for the first MD page, in association with the first unique transaction ID.

In certain arrangements, the method includes applying a hash function to the PLB reference value to obtain a hash of the PLB reference value, and maintaining, in the local memory, the hash of the PLB reference value in a hash table.

In certain arrangements, the method includes determining that the PLB is only partially filled with MD pages by checking the PLB reference value against one or more hashes of PLB reference values maintained in the hash table.

In certain arrangements, the method includes, during performance of a second transaction commit operation by the storage node, writing raw delta updates of MD pages to the MD delta log. At least some of the raw delta updates correspond to bulk updates of a second MD page.

In certain arrangements, the method includes, for the second MD page containing bulk updates, writing, to the MD delta log, the bulk updates of the second MD page, a TT update for the second MD page, and the PLB reference value, in association with a second unique transaction identifier (ID). The TT update for the second MD page includes the first PLB address, and a second PLB address of the PLB. The logical address is mapped to the second PLB address.

In certain arrangements, the method includes synchronizing, in the local memory, at least the bulk updates of the second MD page, and the TT update for the second MD page, in association with the second unique transaction ID.

In certain arrangements, the method includes generating the MD stream for the first MD page and the second MD page, passing the MD stream including the first MD page and the second MD page to the MD pages tier, and storing the second MD page at the second PLB address, in accordance with the TT update for the second MD page. The second PLB address corresponds to a second address of the RAID stripe.

In certain arrangements, the method includes, in response to storing the second MD page in the PLB, updating, in the local memory, the parity data for the RAID stripe including the second MD page.

In certain arrangements, the method includes, once the PLB is completely filled with MD pages, storing the updated parity data in at least one parity page of the RAID stripe, and destaging the PLB in its entirety to a parity RAID tier of the tiered storage array.

In certain arrangements, the first MD page corresponds to a first version of a respective MD page containing bulk updates, and the second MD page corresponds to a second version of the respective MD page containing bulk updates. The method includes, in response to concurrent failure of a storage drive and loss of the local memory, replaying transactions in the MD delta log corresponding to the first version of the respective MD page and the second version of the respective MD page, and reconstructing the hash table using PLB reference values associated with the respective transactions.

In certain arrangements, the method includes, in response to the concurrent failure of the storage drive and loss of the local memory, for each transaction in the MD delta log in which the second version of the respective MD page includes corrupted or unreadable MD, accessing the first PLB address from the transaction, reading the first version of the respective MD page stored at the first PLB address, and reconstructing the second version of the respective MD page by applying, to the first version of the respective MD page, delta updates from the respective transactions related to the first version of the respective MD page.

In certain embodiments, a system includes a memory, and processing circuitry configured to execute program instructions out of the memory to, during performance of a first transaction commit operation, write raw delta updates of MD pages to an MD delta log. At least some of the raw delta updates correspond to bulk updates of a first MD page. The processing circuitry is configured to execute the program instructions out of the memory to generate an MD stream for the first MD page containing bulk updates, pass the MD stream to a tiered storage array, and store the first MD page in a PLB on an MD page tier of the tiered storage array. The PLB is only partially filled with MD pages. The processing circuitry is configured to execute the program instructions out of the memory to, in response to storing the first MD page in the PLB, update, in local memory, parity data for a RAID stripe including the first MD page, and, in response to a storage drive failure, rebuild the RAID stripe using the updated parity data in the local memory.

In certain arrangements, the processing circuitry is configured to execute the program instructions out of the memory to, for the first MD page containing bulk updates, write, to the MD delta log, the bulk updates of the first MD page, a logical-to-physical address translation table (TT) update for the first MD page, and a PLB reference value, in association with a first unique transaction identifier (ID).

In certain arrangements, the processing circuitry is configured to execute the program instructions out of the memory to store the first MD page at a first PLB address of the PLB, in accordance with the TT update for the first MD page. The TT update includes the first PLB address. A logical address of the first MD page is mapped to the first PLB address. The first PLB address corresponds to a first address of the RAID stripe.

In certain embodiments, a computer program product includes a set of non-transitory, computer-readable media having instructions that, when executed by processing circuitry of a storage node in a clustered system, cause the processing circuitry to perform a method including, during performance of a first transaction commit operation by a storage node, writing raw delta updates of MD pages to an MD delta log. At least some of the raw delta updates correspond to bulk updates of a first MD page. The method includes generating an MD stream for the first MD page containing bulk updates, passing the MD stream to a tiered storage array, and storing the first MD page in a PLB on an MD page tier of the tiered storage array. The PLB is only partially filled with MD pages. The method includes, in response to storing the first MD page in the PLB, updating, in local memory, parity data for a RAID stripe including the first MD page, and, in response to a storage drive failure, rebuilding the RAID stripe using the updated parity data in the local memory.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for implementing metadata (MD) streams that provide high performance with increased resiliency for storage nodes that employ MD delta logs and log structured MD. The disclosed techniques can include, during a transaction commit operation, writing raw delta updates of MD pages to an MD delta log. For each MD page containing bulk updates, at least the bulk updates and a TT update (including new and old PLB addresses for the MD page) can be written to the MD delta log, in association with a unique transaction identifier (ID). The disclosed techniques can include generating an MD stream for the MD page, passing the MD stream to a tiered storage array, and storing the MD page in a physical layer block (PLB) on an MD pages tier of the tiered storage array. The PLB can be in a parity RAID configuration, which can include one or more RAID stripes formed by physical pages and parity pages distributed across multiple storage devices. The disclosed techniques can include, in response to storing the MD page in the PLB, updating, in local memory, parity data for a corresponding RAID stripe included in the PLB. The disclosed techniques can include, once the PLB has been completely filled with stored MD pages, storing the updated parity data in at least one parity page (or parity block) of the corresponding RAID stripe, and destaging the PLB in its entirety to a parity RAID tier of the tiered storage array. The disclosed techniques can include, in response to a failure of one of the multiple storage devices when the PLB is only partially filled with stored MD pages, rebuilding the RAID stripe data using the updated parity data in local memory.

Figure 1:
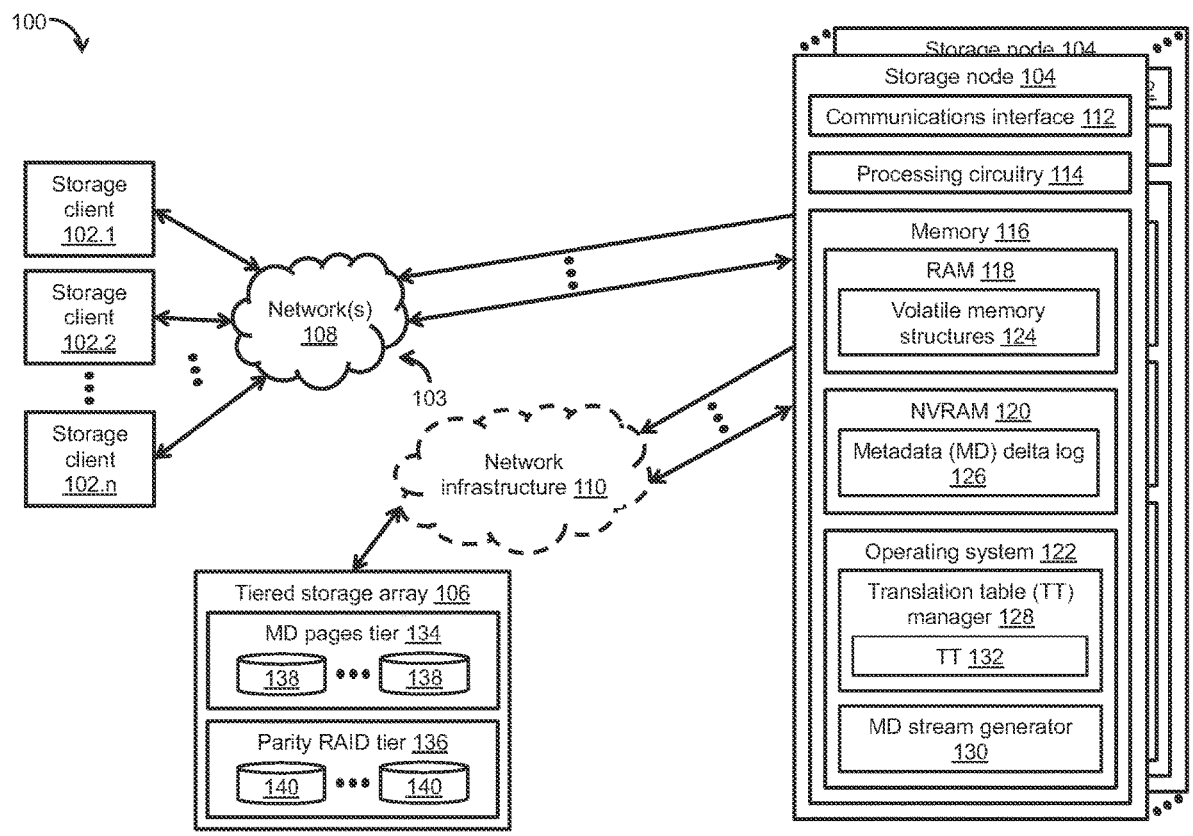
FIG. 1 is a block diagram of an exemplary storage environment, in which techniques can be practiced for implementing metadata (MD) streams that provide high performance with increased resiliency for storage nodes that employ MD delta logs and log structured MD.

FIG. 1 depicts an illustrative embodiment of an exemplary storage environment 100, in which techniques can be practiced for implementing MD streams that provide high performance with increased resiliency for storage nodes that employ MD delta logs and log structured MD. As shown in FIG. 1, the storage environment 100 can include a plurality of storage client computers ("storage clients") 102.1, 102.2, . . . , 102.n, a plurality of storage processors ("storage nodes") 104, and a tiered storage array 106, as well as a communications medium 103 that includes at least one network 108. Each storage client 102.1, . . . , 102.n can provide, over the network(s) 108, storage input/output (IO) requests (e.g., small computer system interface (SCSI) commands, network file system (NFS) commands) to a storage node 104. Such storage IO requests (e.g., write requests, read requests) can direct the storage node 104 to write and/or read user data and/or MD pages, blocks, files, or any other suitable storage elements to/from volumes (VOLs), virtual volumes (VVOLs) (e.g., VMware® VVOLs), logical units (LUs), filesystems, directories, or any other suitable storage objects maintained on storage devices (e.g., solid state drives (SSDs), flash drives, hard disk drives (HDDs)) in the tiered storage array 106.

The communications medium 103 can be configured to interconnect the plurality of storage clients 102.1, . . . , 102.n with the storage node 104 to enable them to communicate and exchange user data, MD, and/or control signaling. As shown in FIG. 1, the communications medium 103 can be illustrated as a "cloud" to represent different network topologies, such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based communications devices and cabling, fiber optic devices and cabling, wireless devices, and so on, or any suitable combination thereof.

The storage node 104 can be communicably connected directly to the tiered storage array 106, or through an optional network infrastructure 110, which can include an Ethernet (e.g., layer 2 or layer 3) network, an InfiniBand network, a fiber channel network, and/or any other suitable network. As shown in FIG. 1, the storage node 104 can include a communications interface 112, processing circuitry 114, and memory 116. The communications interface 112 can include an Ethernet interface, an InfiniBand interface, a fiber channel interface, or any other suitable communications interface. The communications interface 112 can further include SCSI target adapters, network interface adapters, or any other suitable adapters for converting electronic, optical, or wireless signals received over the network(s) 108 to a form suitable for use by the processing circuitry 114. The processing circuitry 114 (e.g., central processing unit (CPU)) can include a set of processing cores (e.g., CPU cores) configured to execute specialized code, modules, and/or logic as program instructions out of the memory 116, process storage IO requests (e.g., write requests, read requests) issued by the storage clients 102.1, . . . , 102.n, and store user data and/or MD in the storage devices in the tiered storage array 106 within the storage environment 100, which can be a RAID environment. In one embodiment, the tiered storage array 106 can include an MD pages tier 134 (e.g., a "fast" tier) containing a plurality of SSDs 138, and a parity RAID tier 136 (e.g., a "slow" tier) containing a plurality of HDDs 140.

The memory 116 can include volatile memory, such as random access memory (RAM) 118 or any other suitable volatile memory, and nonvolatile memory, such as nonvolatile RAM (NVRAM) 120, a nonvolatile dual in-line memory module (NVDIMM), an SSD, or any other suitable nonvolatile memory. As shown in FIG. 1, the RAM 118 can include volatile memory structures 124, and the NVRAM 120 can include an MD delta log 126. In one embodiment, the volatile memory structures 124 can store, at least temporarily, transaction records of MD pages specified by write requests issued by the storage clients 102.1, . . . 102.n. Further, the MD delta log 126 can store and persist, at least temporarily, data or information ("deltas") pertaining to the MD pages specified by the write requests, which can be destaged, flushed, transferred, or otherwise passed (e.g., in the background) to storage objects (e.g., VOLs) maintained on storage devices (e.g., SSDs) of the MD pages tier 134, and/or storage devices (e.g., HDDs) of the parity RAID tier 136. The memory 116 can accommodate an operating system (OS) 122, such as a Linux OS, Unix OS, Windows OS, or any other suitable OS, as well as specialized software code, modules, and/or logic including a logical-to-physical address translation table (TT) manager 128 for managing updates of a TT 132 ("TT updates"), an MD stream generator 130 for generating MD streams of MD pages containing bulk updates, namespace logic, mapping logic, RAID logic, and so on.

In the context of the processing circuitry 114 being implemented by a set of CPU cores executing specialized code, modules, and/or logic as program instructions out of the memory 116, a computer program product can be configured to deliver all or a portion of the specialized code, modules, and/or logic to the set of CPU cores. Such a computer program product can include one or more non-transient computer-readable storage media, such as a magnetic disk, magnetic tape, compact disk (CD), digital versatile disk (DVD), optical disk, flash drive, SSD, secure digital (SD) chip or device, application specific integrated circuit (ASIC), field programmable gate array (FPGA), and so on. The non-transient computer-readable storage media can be encoded with sets of program instructions for performing, when executed by the set of CPU cores, the various techniques and/or methods disclosed herein.

Figure 2A:
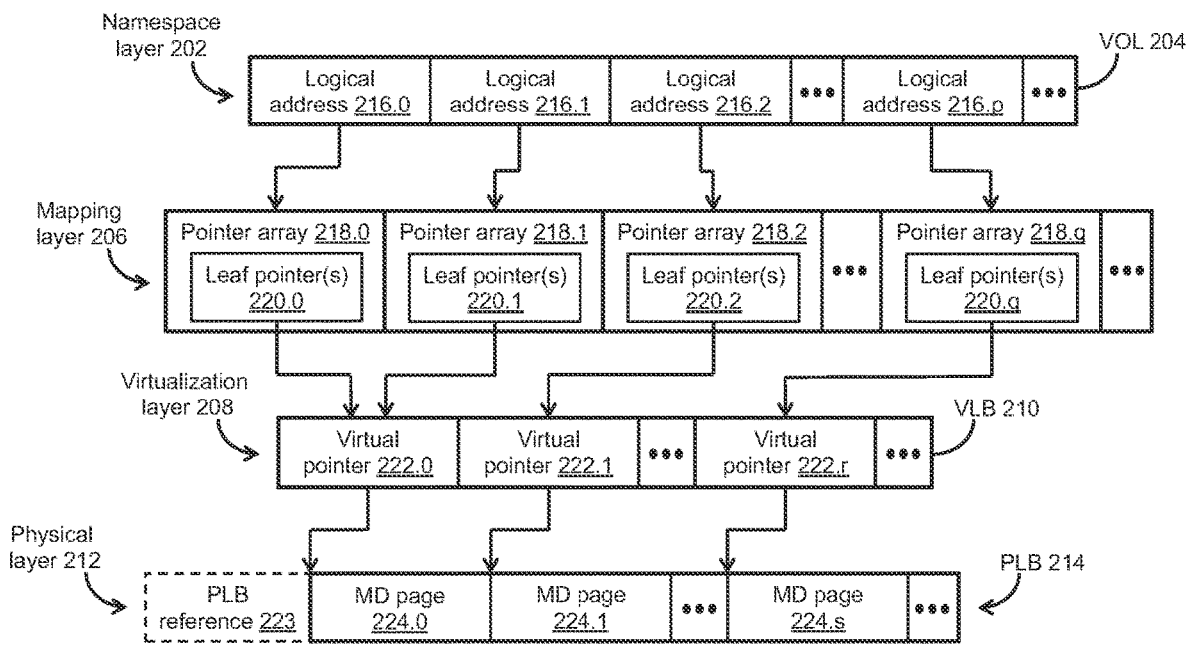
FIG. 2a is a block diagram of an exemplary namespace layer and exemplary layers of indirection that can be implemented on a storage node in the storage environment of FIG. 1, in which the layers of indirection include a mapping layer and a virtualization layer for accessing MD pages on a physical layer included in (or associated with) the storage node.

FIG. 2a depicts an exemplary namespace layer 202 and exemplary layers of indirection (reference numerals 206, 208) that can be implemented as logical structures in the memory 116 of the storage node 104 (see FIG. 1). As shown in FIG. 2a, the layers of indirection can include a mapping layer 206 and a virtualization layer 208 for accessing MD pages on a physical layer 212 included in (or associated with) the storage node 104. In one embodiment, the namespace layer 202 can include a plurality of storage objects like a VOL 204, which can have a logical address 216.0, a logical address 216.1, a logical address 216.2, . . . , and so on, up to at least a logical address 216.p associated therewith. Such logical addresses 216.0, 216.1, 216.2, . . . , 216.p, . . . can correspond to contiguous offsets into the VOL 204. The virtualization layer 208 can include a plurality of virtual layer blocks (VLBs) like a VLB 210, which can have a virtual pointer 222.0, a virtual pointer 222.1, and so on, up to at least a virtual pointer 222.r associated therewith. The mapping layer 206 can include a pointer array 218.0, a pointer array 218.1, a pointer array 218.2, and so on, up to at least a pointer array 218.q. The mapping layer 206 can be configured to map the logical addresses 216.0, 216.1, 216.2, . . . , 216.p, . . . of the VOL 204 to the virtual pointers 222.0, 222.1, . . . , 222.r, . . . of the VLB 210. In one embodiment, the pointer arrays 218.0, 218.1, 218.2, . . . , 218.q, . . . of the mapping layer 206 can be arranged in a mapping hierarchy of a tree data structure (e.g., b-tree), a lowest level of which can include an array of leaf pointers, such as a leaf pointer(s) 220.0, a leaf pointer(s) 220.1, a leaf pointer(s) 220.2, and so on, up to at least a leaf pointer(s) 220.q. In the mapping of the logical addresses 216.0, 216.1, 216.2, . . . , 216.p, . . . of the VOL 204 to the virtual pointers 222.0, 222.1, . . . , 222.r . . . of the VLB 210, each of the leaf pointers 220.0, 220.1, 220.2, . . . , 220.q, . . . can point to one of the virtual pointers 222.0, 222.1, . . . , 222.r . . . . For example, the leaf pointer 220.0 can point to the virtual pointer 222.0, the leaf pointer 220.1 can also point to the virtual pointer 222.0, the leaf pointer 220.2 can point to the virtual pointer 222.1, and so on, up to at least the leaf pointer 220.q, which can point to the virtual pointer 222.r. In this way, the virtualization layer 208 can support data deduplication in the storage environment 100 of FIG. 1, as illustrated by the logical addresses 216.0, 216.1 of the VOL 204 each being mapped to the same virtual pointer 222.0 of the VLB 210.

The physical layer 212 can include a plurality of physical layer blocks (PLBs) like a PLB 214, a portion of which is illustrated in FIG. 2a. The physical layer 212 can describe actual physical address locations of MD pages, such as an MD page 224.0, an MD page 224.1, and so on, up to at least an MD page 224.s. The PLB 214 can have a corresponding PLB reference value 223. In one embodiment, each MD page 224.0, 224.1, . . . , 224.s . . . can have a specified amount of storage capacity (e.g., 4 kilobytes (KB), 8 KB), such as an MD page containing bulk updates. Such MD pages, which may be highly amortized, can be stored in the tiered storage array 106 using the techniques and/or methods described herein. In one embodiment, the PLB 214 (e.g., 2 megabyte (MB) chunk) can correspond to one of a plurality of PLBs included in a RAID block, one or more of which can be organized into the tiered storage array 106. The storage node 104 can execute the RAID logic to select a plurality of drive extents (e.g., drive extents 0-5, see FIG. 2b) from different storage drives of the tiered storage array 106 to form the RAID block, and divide physical storage space of the PLB 214 into at least one RAID stripe 228 (see FIG. 2b) across the different storage drives. The number and arrangement of physical MD pages in the RAID stripe 228 can be based on a specific RAID type. In one embodiment, as shown in FIG. 2b, the RAID stripe 228 can be based on a 4+2 RAID 6-type, which can include four (4) physical MD pages (e.g., MD pages 225.0, 225.1, 225.2, 225.3) and two (2) parity pages (e.g., P 226, Q 227).

During operation, the storage node 104 can use the translation table (TT) 132 to map a logical address space of the storage node 104 to a physical address space of the tiered storage array 106, as well as track old and new PLB addresses for stored MD pages. Further, the storage node 104 can use the volatile memory structures 124 in the RAM 118 for storing and/or aggregating (i) all "raw" delta updates of MD pages, (ii) a specialized "drop-delta" (DD) flag for each MD page containing bulk updates, (iii) logical-to-physical address updates of the TT 132 (including new PLB addresses for MD pages), and/or (iv) reference values of PLBs in the process of being filled with MD pages. The DD flag for each MD page containing bulk updates can provide an indication that all delta updates of the MD page that occurred before it was stored in the tiered storage array 106 are no longer valid, and should be dropped or discarded. The storage node 104 can apply a hash function (e.g., SHA-1) to reference values of PLBs in the process of being filled with MD pages, and maintain, in the RAM 118, a hash table (reference numeral 324; see FIG. 3) containing the resulting hash values. The storage node 104 can further maintain, in the RAM 118, storage for parity data of RAID stripes (reference numeral 322; see FIG. 3) that include MD pages stored in partially filled PLBs. The storage node 104 can use the MD delta log 126 for logging (i) the raw delta updates of MD pages, (ii) the DD flag for each MD page containing bulk updates, (iii) logical-to-physical address updates of the TT 132 (including the new PLB addresses for MD pages and their corresponding old PLB addresses), and/or (iv) the reference values of the PLBs in the process of being filled with MD pages. For each transaction commit entry, the MD delta log can maintain raw delta update(s), a DD flag, a TT update (including new and old PLB addresses for a MD page), and/or a reference value of a PLB in the process of being filled with MD pages, atomically within the scope of the transaction.

When performing a transaction commit operation, the storage node 104 can write raw delta updates of MD pages to the MD delta log 126. For each MD page containing bulk updates, the storage node 104 can write at least the bulk updates and a TT update (including new and old PLB addresses for the MD page) to the MD delta log 126, in association with a unique transaction identifier (ID) (e.g., sequence ID or "SeqID"). The storage node 104 can use the MD stream generator 130 to generate an MD stream for the MD page, pass the MD stream to the tiered storage array 106, and store the MD page in a PLB on the MD pages tier 134 of the tiered storage array 106. The PLB can be in a parity RAID configuration, which can include one or more RAID stripes formed by physical pages and parity pages distributed across multiple storage devices. The PLB can be at least partially filled with stored MD pages. In response to storing the MD page in the PLB, the storage node 104 can update, in the RAM 118, parity data for a corresponding RAID stripe included in the PLB. Once the PLB has been completely filled with stored MD pages, the storage node 104 can store the updated parity data in at least one parity page (or parity block) of the corresponding RAID stripe, and destage the PLB in its entirety to the parity RAID tier 136 of the tiered storage array 106. In response to a failure of one of the multiple storage devices when the PLB is only partially filled with stored MD pages, the storage node 104 can rebuild the RAID stripe data using the updated parity data in the RAM 118.

Figures 2B, 4:
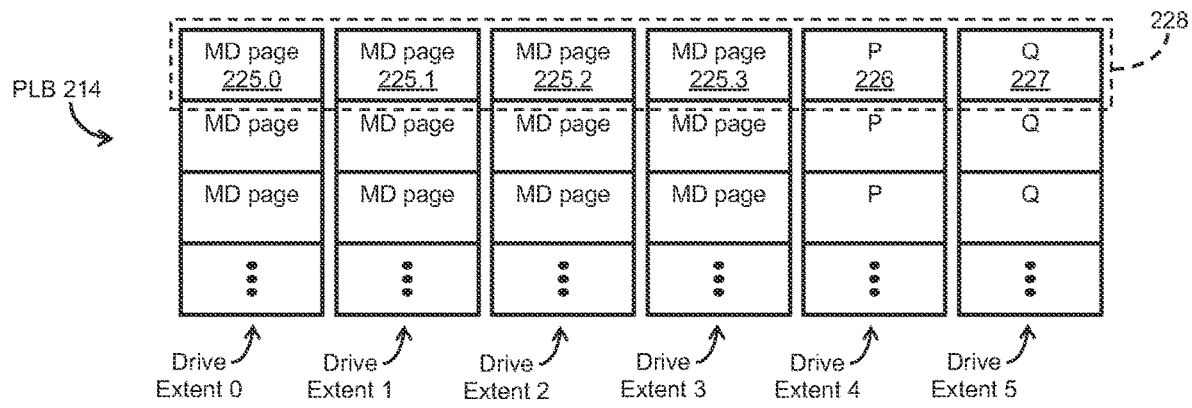
FIG. 2b is a diagram of an exemplary RAID stripe based on a 4+2 RAID 6-type parity RAID configuration.
FIG. 4 is an exemplary logical-to-physical address translation table (TT) containing TT updates of two (2) versions of an MD page containing bulk updates.
Figure 3:
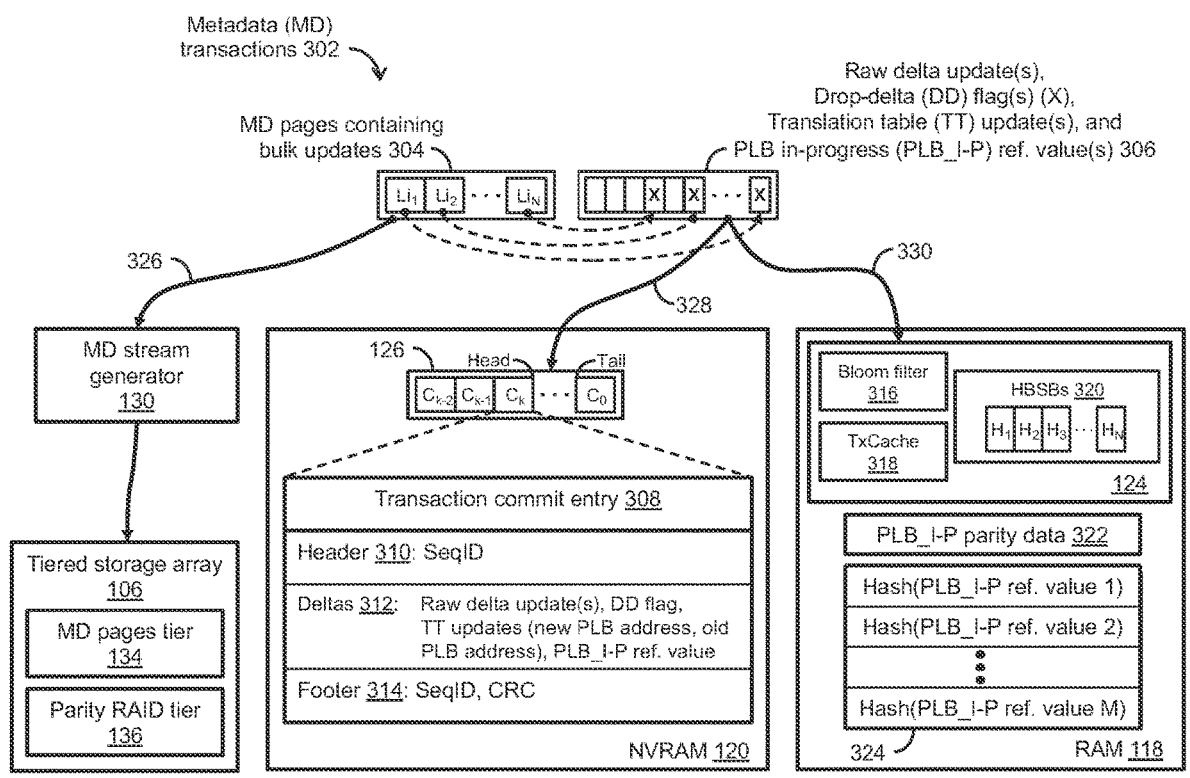
FIG. 3 is a block diagram of volatile memory components, persistent memory components, and MD storage components that can be implemented on a storage node in the storage environment of FIG. 1.

The disclosed techniques for implementing MD streams, which provide high performance with increased resiliency for storage nodes that employ MD delta logs and log structured MD, will be further understood with reference to the following illustrative example and FIGS. 2-4. FIG. 3 depicts several components of the storage node 104, namely, the RAM 118, the NVRAM 120, the MD stream generator 130, and the tiered storage array 106. As shown in FIG. 3, the RAM 118 can include the volatile memory structures 124, which can include a bloom filter 316, a transaction cache ("TxCache") 318, and a set of hash-based sorted buckets (HBSBs) 320. The HBSBs 320 can include a set of data containers, $H_1, H_2, H_3, \ldots, H_N$, for storing delta updates of MD pages. In one embodiment, each of the data containers, $H_1, \ldots, H_N$, can be configured as a tree data structure (e.g., b-tree). The storage node 104 can use the bloom filter 316 to quickly determine whether or not delta updates for particular MD pages are contained in any of the data containers, $H_1, \ldots, H_N$, of the HBSBs 320. The RAM 118 can further include the hash table 324 containing hashes of reference values of PLBs in the process of being filled with MD pages (e.g., Hash (PLB_I-P ref. value 1), Hash (PLB_I-P ref. value 2), ..., Hash (PLB_I-P ref. value M)), as well as the storage 322 for parity data of RAID stripes that include MD pages stored in the PLBs in the process of being filled (PLB_I-P parity data).

As further shown in FIG. 3, the NVRAM 120 can include the MD delta log 126, which can store a plurality of transaction commit entries, $C_{k-2}, C_{k-1}, C_k, \ldots, C_0$, each of which can include (i) raw delta updates of an MD page, (ii) a DD flag, (iii) a TT update (including a new PLB address for the MD page and, as appropriate, a corresponding old PLB address), and/or (iv) a reference value of a PLB in the process of being filled with MD pages (PLB_I-P ref. value), within the scope of a transaction (generally illustrated at reference numeral 312, "Deltas"; see FIG. 3). In one embodiment, the MD delta log 126 can be configured as a ring buffer, in which one or more transaction commit entries (e.g., $C_{k-2}, C_{k-1}, C_k$) can be added to the "Head" of the ring buffer, and at least one transaction commit entry (e.g., $C_0$) can be released from the "Tail" of the ring buffer. Each of the transaction commit entries, $C_{k-2}, C_{k-1}, C_k, \ldots, C_0$ (such as the transaction commit entry, $C_k$), can include a header 310 containing at least a unique transaction ID ("SeqId"), and a footer 314 containing at least the SeqId, and a cyclic redundancy code or checksum ("CRC") value.

In this example, the storage node 104 performs transaction commit operations to commit, in respective MD transactions 302, MD pages 304 (e.g., $Li_1, Li_2, \ldots, Li_N$) containing bulk updates to storage on the tiered storage array 106. The MD pages, $Li_1, Li_2$, correspond to two (2) versions, Ver. 1, Ver. 2, respectively, of the same MD page containing bulk updates, i.e., a first version, Ver. 1, and a second version, Ver. 2. In a first transaction commit operation, the storage node 104 executes a first transaction commit thread to acquire an exclusive lock for the first version, Li (Ver. 1), of the MD page, and to write or persist the transaction commit entry, $C_{k-2}$, to the MD delta log 126 (as illustrated by an arrow 328). The transaction commit entry, $C_{k-2}$, includes at least a raw delta update(s), a DD flag (X), a TT update for the first version, $Li_1$ (Ver. 1), of the MD page (e.g., PLB_addr_1 ($Li_1$, Ver. 1) 412A; see FIG. 4), and a PLB reference value (e.g., PLB_I-P ref. value 1; see FIG. 3). In this example, it is assumed that the first version, $Li_1$ (Ver. 1), of the MD page is the first MD page written to the PLB in the physical layer 212 (see FIG. 2a). As such, the PLB is in the process of being filled with MD pages. For this reason, the transaction commit entry, $C_{k-2}$, includes the PLB reference value (e.g., PLB_I-P ref. value 1; see FIG. 3). The storage node 104 further executes the first transaction commit thread to update the header of the transaction commit entry, $C_{k-2}$, to include a corresponding SeqId, and to update the footer of the transaction commit entry, $C_{k-2}$, to include the corresponding SeqId, and a CRC value. It is noted that, while building an up-to-date MD page, e.g., during a cache miss or destage operation, the DD flag (X) can provide an indication that all delta updates that occurred before the writing of the MD page are no longer valid, and should be dropped or discarded.

FIG. 4 depicts the logical-to-physical address translation table (TT) 132, which contains TT updates for at least the two (2) versions, $Li_1$ (Ver. 1), $Li_2$ (Ver. 2), of the MD page containing bulk updates. As described herein, the storage node 104 can use the TT 132 to map a logical address space to a physical address space of the tiered storage array 106, allowing MD pages in the physical address space to be moved without having to update any logical address references associated with the MD pages. As shown in FIG. 4, the storage node 104 uses the TT 132 to map a logical address, logical_addr_0 410A, to the PLB address, PLB_addr_1 ($Li_1$, Ver. 1) 412A, of the first version, $Li_1$ (Ver. 1), of the MD page. In this example, the PLB address, PLB_addr_1 ($Li_1$, Ver. 1) 412A, corresponds to an address of a RAID stripe in the physical storage space of the PLB. Once the first version, $Li_1$ (Ver. 1), of the MD page is written to the PLB, the storage node 104 updates parity data for the RAID stripe, and maintains the updated parity data in the storage 322 (PLB_I-P parity data; see FIG. 3).

Having written or persisted the transaction commit entry, $C_{k-2}$, to the MD delta log 126, the storage node 104 executes the first transaction commit thread to update or synchronize, in the volatile memory structures 124 (as illustrated by an arrow 330), at least the raw delta update(s), the DD flag (X), the TT update for the first version, $Li_1$ (Ver. 1) (e.g., PLB_addr_1 ($Li_1$, Ver. 1) 412A; see FIG. 4), of the MD page, and the PLB reference value (e.g., PLB_I-P ref. value 1; see FIG. 3), included in the transaction commit entry, $C_{k-2}$ (generally illustrated at reference numeral 306; see FIG. 3). In this example, such updates are converted into an MD update "tuple" including multiple tuple entries, including (i) a logical index, Li, of a corresponding MD page, (ii) an offset, Ei, within the MD page, (iii) a record or delta type, T, defining the size of the update, and (iv) a payload or value, V, of the update. The designations, $H_1, \ldots, H_N$, of the data containers of the HBSBs 320 correspond to hash values, which the storage node 104 obtains by applying a hash function (e.g., SHA-1) to the logical indices, $Li_1, \ldots, Li_N$, of the MD pages. In this way, the data container, $H_1$, can be associated with the first version, $Li_1$ (Ver. 1), of the MD page, based on the hash of the logical index, $Li_1$, of the MD page. The storage node 104 also applies a hash function (e.g., SHA-1) to the PLB reference value, PLB_I-P ref. value 1, and maintains the resulting hash value, Hash (PLB_I-P ref. value 1), in the hash table 324. Once the raw delta update(s), the DD flag (X), the TT update for the first version, $Li_1$ (Ver. 1) (e.g., the PLB address, PLB_addr_1 ($Li_1$, Ver. 1)), of the MD page, and the PLB reference value (e.g., PLB_I-P ref. value 1; see FIG. 3), included in the transaction commit entry, $C_{k-2}$, are updated or synchronized in the volatile memory structures 124, the exclusive lock for the first version, $Li_1$ (Ver. 1), of the MD page is released.

In this example, in a second transaction commit operation, the storage node 104 executes a second transaction commit thread to acquire an exclusive lock for the second version, $Li_2$ (Ver. 2), of the MD page, and to write or persist the transaction commit entry, $C_{k-1}$, to the MD delta log 126 (as illustrated by an arrow 328). The transaction commit entry, $C_{k-1}$, includes, for the second version, $Li_2$ (Ver. 2), of the MD page, at least a raw delta update(s), a DD flag (X), a TT update for the second version, $Li_2$ (Ver. 2) (e.g., a new PLB address, PLB_addr_2 ($Li_2$, Ver. 2) 412B (see FIG. 4), and the old PLB address, PLB_addr_1 ($Li_1$, Ver. 1) 412A (see FIG. 4)), of the MD page, and the PLB reference value (e.g., PLB_I-P ref. value 1; see FIG. 3). The storage node 104 executes the second transaction commit thread to update the header of the transaction commit entry, $C_{k-1}$, to include a corresponding SeqId, and to update the footer of the transaction commit entry, $C_{k-1}$, to include the corresponding SeqId, and a CRC value. Further, the storage node 104 uses the TT 132 to map the logical address, logical_addr_0 410B (see FIG. 4), to the new PLB address, PLB_addr_2 ($Li_2$, Ver. 2) 412B (see FIG. 4), of the second version, $Li_2$ (Ver. 2), of the MD page. Like the PLB address of the first version, $Li_1$ (Ver. 1), of the MD page (e.g., PLB_addr_1 ($Li_1$, Ver. 1) 412A; see FIG. 4), the PLB address of the second version, $Li_2$ (Ver. 2), of the MD page (e.g., PLB_addr_2 ($Li_2$, Ver. 2) 412B; see FIG. 4) corresponds to an address of the RAID stripe in the physical storage space of the PLB. Once the second version, $Li_2$ (Ver. 2), of the MD page is written to the PLB, the storage node 104 updates the parity data for the RAID stripe, and maintains the updated parity data in the storage 322 (PLB_I-P parity data).

Having written or persisted the transaction commit entry, $C_{k-1}$, to the MD delta log 126, the storage node 104 executes the second transaction commit thread to update or synchronize, in the volatile memory structures 124 (as illustrated by an arrow 330), at least the raw delta update(s), the DD flag (X), the TT update for the second version, $Li_2$ (Ver. 2) (e.g., the new PLB address, PLB_addr_2 ($Li_2$, Ver. 2) 412B; see FIG. 4), of the MD page, and the PLB reference value (e.g., PLB_I-P ref. value 1; see FIG. 3), included in the transaction commit entry, $C_{k-1}$. As described herein with reference to the first transaction commit thread, such updates performed while executing the second transaction commit thread can be converted into an MD update "tuple" including multiple tuple entries (e.g., Li, Ei, T, V). Further, the designations, $H_1, H_2$, and so on, of the data containers of the HBSBs 314 can correspond to hash values, which can be obtained by applying a hash function to the logical indices, $Li_1, Li_2$, and so on, of the MD pages. In this way, the data container, $H_2$, of the HBSBs 314 can be associated with the second version, $Li_2$ (Ver. 2), of the MD page, based on the hash of the logical index, $Li_2$, of the MD page. Once the raw delta update(s), the DD flag (X), the TT update for the second version, $Li_2$ (Ver. 2) (including the new PLB address, PLB_addr_2 ($Li_2$, Ver. 2) 412B; see FIG. 4), of the MD page, and the PLB reference value (e.g., PLB_I-P ref. value 1; see FIG. 3), included in the transaction commit entry, $C_{k-1}$, are updated or synchronized in the volatile memory structures 124, the exclusive lock for the second version, $Li_2$ (Ver. 2), of the MD page is released. It is noted that, in this example, just the new PLB address, PLB_addr_2 ($Li_2$, Ver. 2) 412B, in the TT update for the second version, $Li_2$ (Ver. 2), of the MD page, is updated or synchronized in the volatile memory structures 124 to conserve memory resources. It is further noted that the storage node 104 can perform additional transaction commit operations, like the first and second transaction commit operations described herein, for each of the MD pages 304 (e.g., $Li_1, \ldots, Li_N$) containing bulk updates.

Having written or persisted the transaction commit entries, $C_{k-2}, C_{k-1}$, to the MD delta log 126, and updated or synchronized at least the raw delta updates, the DD flags (X), the TT updates, and the PLB reference values included in the transaction commit entries, $C_{k-2}, C_{k-1}$, in the volatile memory structures 124, the storage node 104 uses the MD stream generator 130 to generate an MD stream containing at least the first and second versions, $Li_1$ (Ver. 1), $Li_2$ (Ver. 2), of the MD page, and to pass the MD stream to the tiered storage array 106. Once the MD stream is passed to the tiered storage array 106, the first and second versions, $Li_1$ (Ver. 1), $Li_2$ (Ver. 2), of the MD page are stored at the old and new PLB addresses, PLB_addr_1 ($Li_1$, Ver. 1) 412A, PLB_addr_2 ($Li_2$, Ver. 2) 412B, respectively, in association with the RAID stripe in the physical storage space of the PLB. Further, once the PLB has been completely filled with stored MD pages, the storage node 104 accesses the updated parity data from the storage 322 (PLB_I-P parity data), stores the updated parity data in at least one parity page (or parity block) of the RAID stripe, and removes the corresponding hash entry, Hash (PLB_I-P ref. value 1), from the hash table 324. The PLB can then be destaged in its entirety to the parity RAID tier 136 of the tiered storage array 106.

In this example, a first failure scenario can be described that involves a failure of a storage drive across which the MD pages are striped, when the PLB is only partially filled with stored MD pages. In this first failure scenario, any parity data contained in a parity page (or parity block) of the RAID stripe is considered invalid, and cannot be used in a data rebuild operation. In response to the failure of the storage drive, the storage node 104 enters a degraded state, and, in the degraded state, checks the PLB reference value against the hash values maintained in the hash table 324 to determine whether the PLB is in the process of being filled with MD pages (i.e., the PLB is only partially filled with stored MD pages). Having determined that the PLB is in the process of being filled with MD pages, the storage node 104 performs a data rebuild operation to reconstruct data for the failed storage drive, using the updated parity data in the storage 322 (PLB_I-P parity data). Otherwise, if the storage node 104 determines that the PLB is not in the process of being filled with MD pages (i.e., the PLB is completely filled with stored MD pages), then the parity data contained in the parity page (or parity block) of the RAID stripe is considered valid, and the storage node 104 performs the data rebuild operation to reconstruct data for the failed storage drive, using the parity data of the RAID stripe.

In this example, a second failure scenario can be described that involves both a failure of a storage drive when a PLB is only partially filled with stored MD pages, and a loss of volatile memory (e.g., RAM) data due to, for example, a restart of the storage node 104. Such a loss of RAM data can include the loss of (i) data contained in the volatile memory structures 124, (ii) PLB_I-P parity data contained in the storage 322, and (iii) data contained in the hash table 324. In this second failure scenario, the storage node 104 enters a degraded state, and, in the degraded state, performs a recovery process using the MD delta log 126, replaying corresponding transactions for MD pages, and reconstructing the hash table 324 using PLB_I-P ref. values included in the corresponding transaction commit entries. Further, for each transaction commit entry for an MD page with corrupted or unreadable data that includes a PLB_I-P ref. value, the storage node 104 accesses an old PLB address of the MD page from the transaction commit entry, reads the MD page stored at the old PLB address, and reconstructs the MD page by applying delta updates from transaction commit entries related to the MD page. Having reconstructed the MD pages with corrupted/unreadable data, the storage node 104 performs a data rebuild operation to reconstruct data for the failed storage drive, using the reconstructed the MD pages. In each of the first and second failure scenarios, the storage node 104 can provide high performance with increased resiliency for PLBs only partially filled with stored MD pages, in which parity data of RAID stripes are considered invalid, and cannot be used in data rebuild operations.

Having described the above illustrative embodiments, various alternative embodiments and/or variations may be made and/or practiced. For example, it was described herein that the storage node 104 can maintain, in the RAM 118, storage for parity data of RAID stripes (reference numeral 322; see FIG. 3) that include MD pages stored in partially filled PLBs. In one embodiment, the storage node 104 can maintain parity data of such RAID stripes in association with a secure data pool microservice (SDPM), which can store the parity data on an object store node within the storage environment 100 (of FIG. 1). Further, in response to a failure of a storage drive and a loss of volatile memory (e.g., RAM) data, the storage node 104 can perform a data rebuild operation to reconstruct data for the failed storage drive, using the parity data maintained in association with the SDPM.

Figure 5:
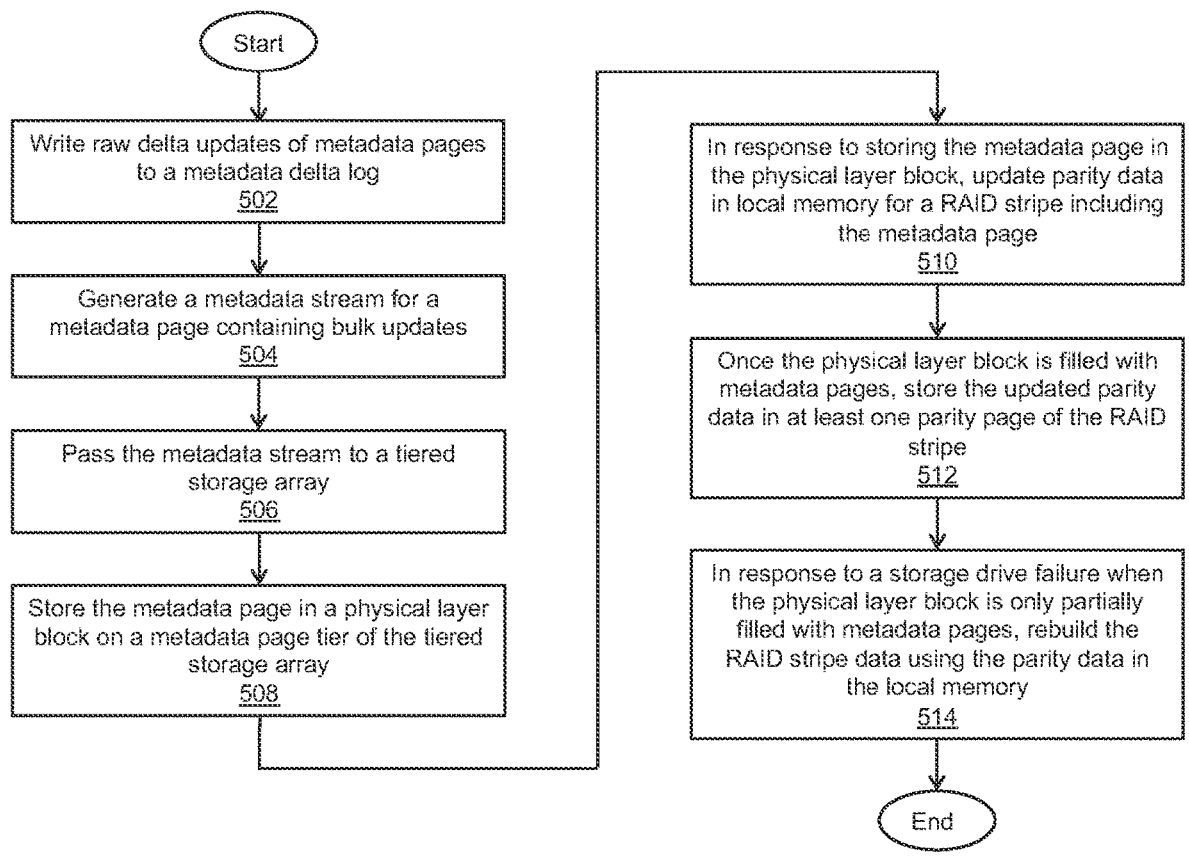
FIG. 5 is a flow diagram of an exemplary method of implementing MD streams that provide high performance with increased resiliency for storage nodes that employ MD delta logs and log structured MD.

A method of implementing metadata streams, which provides high performance with increased resiliency for storage nodes that employ metadata delta logs and log structured metadata, is described below with reference to FIG. 5. As depicted in block 502, raw delta updates of metadata pages are written to a metadata delta log. As depicted in block 504, a metadata stream is generated for a metadata page containing bulk updates. As depicted in block 506, the metadata stream is passed to a tiered storage array. As depicted in block 508, the metadata page is stored in a physical layer block on a parity RAID tier of the tiered storage array. As depicted in block 510, in response to storing the metadata page in the physical layer block, parity data is updated, in local memory, for a RAID stripe including the metadata page. As depicted in block 512, once the physical layer block is filled with metadata pages, the updated parity data is stored in at least one parity page of the RAID stripe. As depicted in block 514, in response to a storage drive failure when the physical layer block is partially filled with metadata pages, the RAID stripe data is rebuilt using the updated parity data in the local memory.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
during performance of a first transaction commit operation by a storage node, writing raw delta updates of metadata (MD) pages to an MD delta log, at least some of the raw delta updates corresponding to bulk updates of a first MD page;
generating an MD stream for the first MD page containing bulk updates;
passing the MD stream to a tiered storage array;
storing the first MD page in a physical layer block (PLB) on an MD page tier of the tiered storage array, the PLB being only partially filled with MD pages;
in response to storing the first MD page in the PLB, updating, in local memory, parity data for a RAID (Redundant Array of Independent Disks) stripe including the first MD page; and
in response to a storage drive failure, rebuilding the RAID stripe using the updated parity data in the local memory.

2. The method of claim 1 wherein the writing of the raw delta updates of MD pages to the MD delta log includes, for the first MD page containing bulk updates, writing, to the MD delta log, the bulk updates of the first MD page, a logical-to-physical address translation table (TT) update for the first MD page, and a PLB reference value, in association with a first unique transaction identifier (ID).

3. The method of claim 2 wherein the storing of the first MD page in the PLB includes storing the first MD page at a first PLB address of the PLB in accordance with the TT update for the first MD page, the TT update including the first PLB address, a logical address of the first MD page being mapped to the first PLB address, the first PLB address corresponding to a first address of the RAID stripe.

4. The method of claim 3 further comprising:
synchronizing, in the local memory, at least the bulk updates of the first MD page and the TT update for the first MD page, in association with the first unique transaction ID.

5. The method of claim 3 further comprising:
applying a hash function to the PLB reference value to obtain a hash of the PLB reference value; and
maintaining, in the local memory, the hash of the PLB reference value in a hash table.

6. The method of claim 5 comprising:
determining that the PLB is only partially filled with MD pages by checking the PLB reference value against one or more hashes of PLB reference values maintained in the hash table.

7. The method of claim 5 further comprising:
during performance of a second transaction commit operation by the storage node, writing raw delta updates of MD pages to the MD delta log, at least some of the raw delta updates corresponding to bulk updates of a second MD page.

8. The method of claim 7 wherein the writing of the raw delta updates of MD pages to the MD delta log includes, for the second MD page containing bulk updates, writing, to the MD delta log, the bulk updates of the second MD page, a TT update for the second MD page, and the PLB reference value, in association with a second unique transaction identifier (ID), the TT update for the second MD page including the first PLB address and a second PLB address of the PLB, the logical address being mapped to the second PLB address.

9. The method of claim 8 further comprising:
synchronizing, in the local memory, at least the bulk updates of the second MD page and the TT update for the second MD page, in association with the second unique transaction ID.

10. The method of claim 8 wherein the generating of the MD stream includes generating the MD stream for the first MD page and the second MD page, wherein the passing of the MD stream to the MD pages tier includes passing the MD stream including the first MD page and the second MD page to the MD pages tier, and wherein the method comprises:
storing the second MD page at the second PLB address in accordance with the TT update for the second MD page, the second PLB address corresponding to a second address of the RAID stripe.

11. The method of claim 10 comprising:
in response to storing the second MD page in the PLB, updating, in the local memory, the parity data for the RAID stripe including the second MD page.

12. The method of claim 11 comprising:
once the PLB is completely filled with MD pages, storing the updated parity data in at least one parity page of the RAID stripe, and destaging the PLB in its entirety to a parity RAID tier of the tiered storage array.

13. The method of claim 11 wherein the first MD page corresponds to a first version of a respective MD page containing bulk updates, and the second MD page corresponds to a second version of the respective MD page containing bulk updates, and wherein the method comprises:
in response to concurrent failure of a storage drive and loss of the local memory:
replaying transactions in the MD delta log corresponding to the first version of the respective MD page and the second version of the respective MD page; and
reconstructing the hash table using PLB reference values associated with the respective transactions.

14. The method of claim 13 comprising:
in response to the concurrent failure of the storage drive and loss of the local memory, for each transaction in the MD delta log in which the second version of the respective MD page includes corrupted or unreadable MD:
   accessing the first PLB address from the transaction;
   reading the first version of the respective MD page stored at the first PLB address; and
   reconstructing the second version of the respective MD page by applying, to the first version of the respective MD page, delta updates from the respective transactions related to the first version of the respective MD page.

15. A system comprising:
a memory; and
processing circuitry configured to execute program instructions out of the memory to:
   during performance of a first transaction commit operation, write raw delta updates of metadata (MD) pages to an MD delta log, at least some of the raw delta updates corresponding to bulk updates of a first MD page;
   generate an MD stream for the first MD page containing bulk updates;
   pass the MD stream to a tiered storage array;
   store the first MD page in a physical layer block (PLB) on an MD page tier of the tiered storage array, the PLB being only partially filled with MD pages;
   in response to storing the first MD page in the PLB, update, in local memory, parity data for a RAID (Redundant Array of Independent Disks) stripe including the first MD page; and
   in response to a storage drive failure, rebuild the RAID stripe using the updated parity data in the local memory.

16. The system of claim 15 wherein the processing circuitry is configured to execute the program instructions out of the memory to, for the first MD page containing bulk updates, write, to the MD delta log, the bulk updates of the first MD page, a logical-to-physical address translation table (TT) update for the first MD page, and a PLB reference value, in association with a first unique transaction identifier (ID).

17. The system of claim 16 wherein the processing circuitry is configured to execute the program instructions out of the memory to store the first MD page at a first PLB address of the PLB in accordance with the TT update for the first MD page, the TT update including the first PLB address, a logical address of the first MD page being mapped to the first PLB address, the first PLB address corresponding to a first address of the RAID stripe.

18. A computer program product including a set of non-transitory, computer-readable media having instructions that, when executed by processing circuitry of a storage node in a clustered system, cause the processing circuitry to perform a method comprising:
   during performance of a first transaction commit operation by a storage node, writing raw delta updates of metadata (MD) pages to an MD delta log, at least some of the raw delta updates corresponding to bulk updates of a first MD page;
   generating an MD stream for the first MD page containing bulk updates;
   passing the MD stream to a tiered storage array;
   storing the first MD page in a physical layer block (PLB) on an MD page tier of the tiered storage array, the PLB being only partially filled with MD pages;
   in response to storing the first MD page in the PLB, updating, in local memory, parity data for a RAID (Redundant Array of Independent Disks) stripe including the first MD page; and
   in response to a storage drive failure, rebuilding the RAID stripe using the updated parity data in the local memory.

19. The computer program product of claim 18 wherein the writing of the raw delta updates of MD pages to the MD delta log includes, for the first MD page containing bulk updates, writing, to the MD delta log, the bulk updates of the first MD page, a logical-to-physical address translation table (TT) update for the first MD page, and a PLB reference value, in association with a first unique transaction identifier (ID).

20. The computer program product of claim 19 wherein the storing of the first MD page in the PLB includes storing the first MD page at a first PLB address of the PLB in accordance with the TT update for the first MD page, the TT update including a logical address mapped to the first PLB address, the first PLB address corresponding to a first address of the RAID stripe.

* * * * *